Oct. 31, 1967 W. J. HANNAN 3,350,600
RC CIRCUIT MEANS TO COMPENSATE FOR DEFOCUSING
OF A PULSED IMAGE INTENSIFIER
Filed May 24, 1965
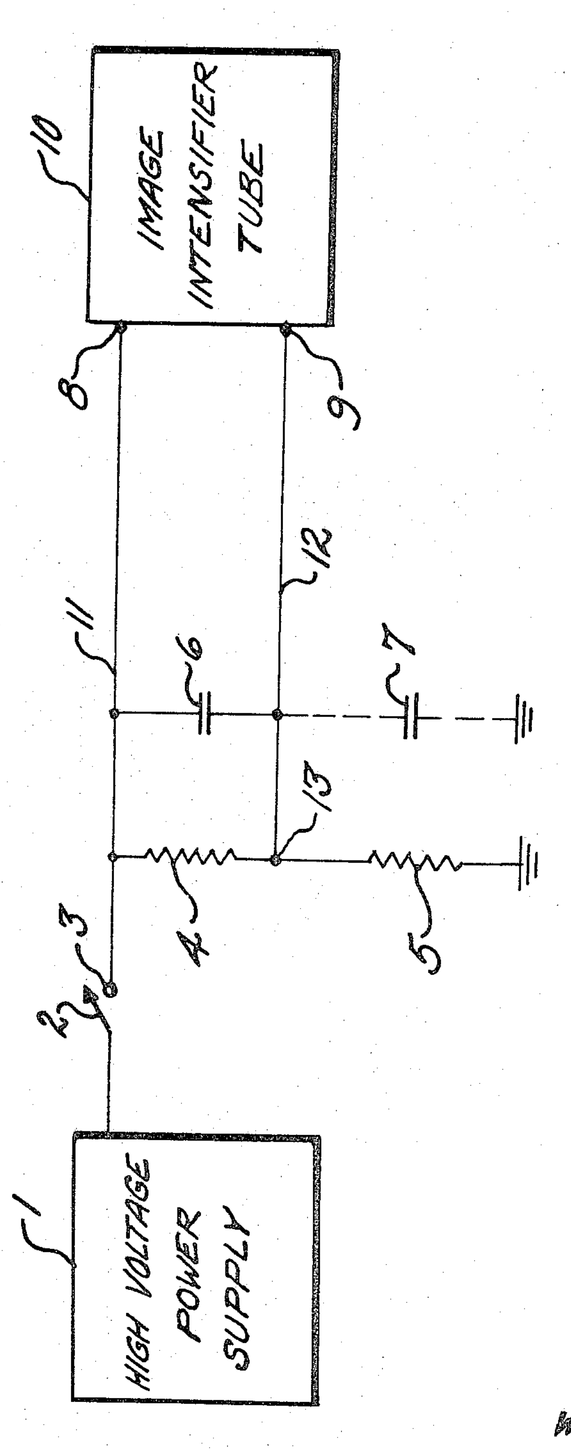
INVENTOR.
WILLIAM J. HANNAN
BY Harry A. Herbert Jr.
and
George Fine
ATTORNEYS United States Patent Office 3,350,600
Patented Oct. 31, 1967

3,350,600

RC CIRCUIT MEANS TO COMPENSATE FOR DEFOCUSING OF A PULSED IMAGE INTENSIFIER

William J. Hannan, Moorestown, N.J., assignor to the United States of America as represented by the Secretary of the Air Force Filed May 24, 1965, Ser. No. 458,524
5 Claims. (Cl. 315—31)

This invention relates to a focus compensating circuit and more particularly to a compensating circuit which maintains focus of a pulsed image intensifier tube when used as an "electronic shutter."

When an image intensifier tube is used as an "electronic shutter" it is essential that focus be maintained during the entire exposure interval including the turn-on and turn-off periods. Proper focus of an image intensifier tube necessitates that the voltage between the photo-cathode and focus electrode be a fixed percentage of the anode to photo-cathode voltage. In a typical application the output faceplate, the photo-cathode and the focus electrode would be at zero volts, −15 kv. and −14.8 kv., respectively. These voltages are switched on for the exposure interval, typically on the order of 20 milliseconds.

The present invention insures that the tube is in focus during the entire exposure period by keeping the wave shape on the focus electrode the same as that on the cathode, but scaled down by a fixed percentage. It is to be noted without the compensating circuit of the present invention, unavoidable tube and wiring capacitance would destroy the focus of the tube during aforesaid turn-on and turn-off periods.

An object of the present invention is to provide a compensation circuit to maintain at all times the focus of an image intensifier tube.

A further object of the present invention is to provide a compensation circuit to maintain at all times the focus of an image intensifier tube when used as an electronic shutter.

Still a further object of the present invention is to provide a compensation circuit for an image intensifier tube to maintain the focus thereof during the entire exposure interval thereof.

The various features of novelty which characterize this invention are pointed out with particularity in the claims annexed to and forming a part of this specification. For a better understanding of the invention, however, its advantages and specific objects obtained with its use, reference should be had to the accompanying drawing and descriptive matter in which is illustrated and described a preferred embodiment of the invention.

Referring now to the drawing, there is shown a conventional image intensifier tube 10. The photo-cathode and focus electrodes of tube 10 are connected to terminals 8 and 9, respectively.

High voltage power supply 1 is connected to the photo-cathode electrode of image intensifier tube 10 by way of exposure switch 2 and treminal 8. The focus electrode of image intensifier tube 10 is connected to high voltage power supply 1 by way of exposure switch 2 and focus compensation network which is comprised of resistors 4 and 5, capacitance 6 and stray capacitance 7. Resistors 4 and 5 are in series and are connected between line 11 and ground. Capacitance 6 is connected across lines 11 and 12.

Stray capacitance 7 exists across resistor 5. Line 12 interconnects terminal 13 to terminal 9.

With pulsed image intensifier tube utilized as an "electronic shutter," focus thereof must be maintained during the entire exposure interval including the turn-on and turn-off periods. Switch 2 controls aforesaid turn-on and off periods by connecting and disconnecting it, respectively, to terminal 3.

In a typical application the output faceplate, the photo-cathode and focus electrode are arranged to be at zero volts, −15 kv. and −14.8 kv., respectively. These voltages are switched on by closing switch 2 for the exposure interval, typically on the order of 20 milliseconds. The aforesaid compensation circuit of image intensfier tube 10 automatically and continuously maintains the focus during the entire exposure period so that the wave shape on the focus electrode is the same as that on the photo-cathode electrode, but scaled down by a fixed percentage.

It is to be particularly noted the compensation circuit includes a voltage divider network of resistors 4 and 5, capacitance 6, and stray capacitance 7. Capacitance 6 is added across voltage divider resistor 4 and its capacitance is selected so that the RC of resistor 4 and capacitance 6 is equal to the RC of resistor 5 and stray capacitance 7.

Without this compensation circuit, unavoidable tube and wiring capacitance would cause the wave shape of the pulse applied to the focus electrode and the photo-cathode electrode to differ and focus would not be maintained during the turn-on and turn-off periods.

What is claimed is:

1. A focus compensation circuit for a pulsed image intensifier tube comprising a pulsed image intensifier tube having photo-cathode and focus electrodes, and a high voltage power supply connected to said photo-cathode electrode by way of a switch and simultaneously connected to said focus electrode by way of said switch and a focus compensation network including a voltage divider network compensated for stray capacitance.

2. A foucus compensation network for a pulsed image intensifier tube comprising a pulsed image intensifier tube having photo-cathode and focus electrodes, a high voltage source connected to said photo-cathode by way of a switch, a voltage divider network connected between said photo-cathode electrode and said focus electrode, and means to compensate said voltage divider for existing stray capacitance.

3. A focus compensation circuit for a pulsed image intensifier tube comprising a pulsed image intensifier tube having photo-cathode and focus electrodes, a high voltage source connected to said photo-cathode electrode by way of a switch, a pair of resistances connected in series from said photo-cathode electrode to ground, said focus electrode also being connected between said pair of resistances, and a capacitance being connected across one of said pair of resistances to compensate said voltage divider for stray capacitance.

4. A focus compensation circuit for a pulsed image intensifier tube comprising a pulse image intensifier tube including photo-cathode and focus electrode, a high voltage power source connected to said photo-cathode by way of a switch, first and second resistors having a predetermined ratio, said first resistor interconnecting said photo-cathode electrode and said focus electrode, said second resistor interconnecting said focus electrode and ground, and means connected across said first resistor to compensate for the stray capacitance existing across said second resistor.

5. A focus compensation network as defined in claim 4 wherein said compensation means consists of a capacitance wherein the RC time constant of said first resistor and said compensating capacitance is equal to the RC time constant of said second resistor and said stray capacitance.

References Cited

UNITED STATES PATENTS 2,494,457 1/1950 Stolze -------------- 315—31

JOHN W. CALDWELL, *Primary Examiner.*

R. BLUM, *Assistant Examiner.*